United States Patent
Heaney

[11] 3,713,543
[45] Jan. 30, 1973

[54] ACTIVATED SEWAGE PLANT

[75] Inventor: Donald F. Heaney, Pittsburgh, Pa.

[73] Assignee: Dravo Corporation, Pittsburgh, Pa.

[22] Filed: Jan. 12, 1970

[21] Appl. No.: 2,103

Related U.S. Application Data

[63] Continuation-in-part of Ser. No. 761,616, Sept. 23, 1968, abandoned.

[52] U.S. Cl. ............... 210/196, 210/8, 210/80, 210/202, 210/256, 210/275
[51] Int. Cl. ........................................... C02c 1/06
[58] Field of Search .................. 210/274, 3–9, 80, 210/252, 256, 257, 265, 195–197, 202, 220, 221, 279, 275

[56] References Cited

UNITED STATES PATENTS

| 3,210,170 | 10/1965 | Spijker et al. | 210/80 X |
|---|---|---|---|
| 3,260,366 | 7/1966 | Duff et al. | 210/80 |
| 3,472,764 | 10/1969 | Culp et al. | 210/8 X |
| 2,901,114 | 8/1959 | Smith et al. | 210/15 X |
| 798,473 | 8/1905 | Wilson | 210/279 |
| 3,545,619 | 12/1970 | Ettlich et al. | 210/196 |
| 3,425,936 | 2/1969 | Culp et al. | 210/8 |
| 3,419,146 | 12/1968 | Koulovatos | 210/195 X |
| 3,425,936 | 2/1969 | Culp et al. | 210/8 |

Primary Examiner—Michael Rogers
Attorney—Parmelee, Utzler & Welsh

[57] ABSTRACT

There is disclosed an activated sewage disposal plant of the compact or so-called "packaged" type and a method of processing sewage wherein a fast filter is provided through which the effluent liquid from the primary processing is passed, provision being made for backwashing the fast-flow filter from time to time with the backwash being collected in a well or vessel from which it is recycled at a controlled rate to the raw sewage. The entire plant can be embodied in a compact package unit, one common type of which comprises two concentric tanks, the outer one of which is divided into several compartments.

9 Claims, 5 Drawing Figures

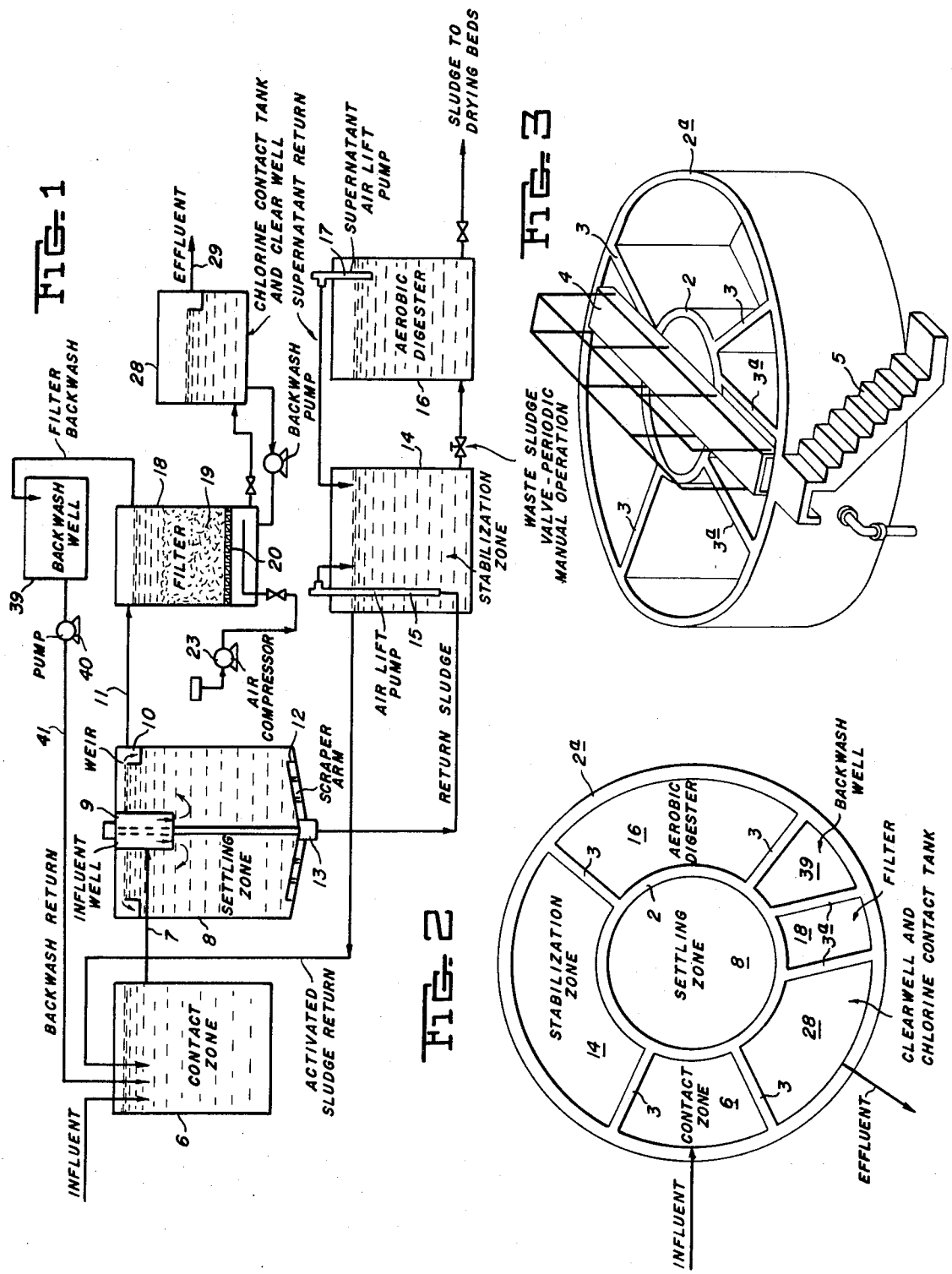

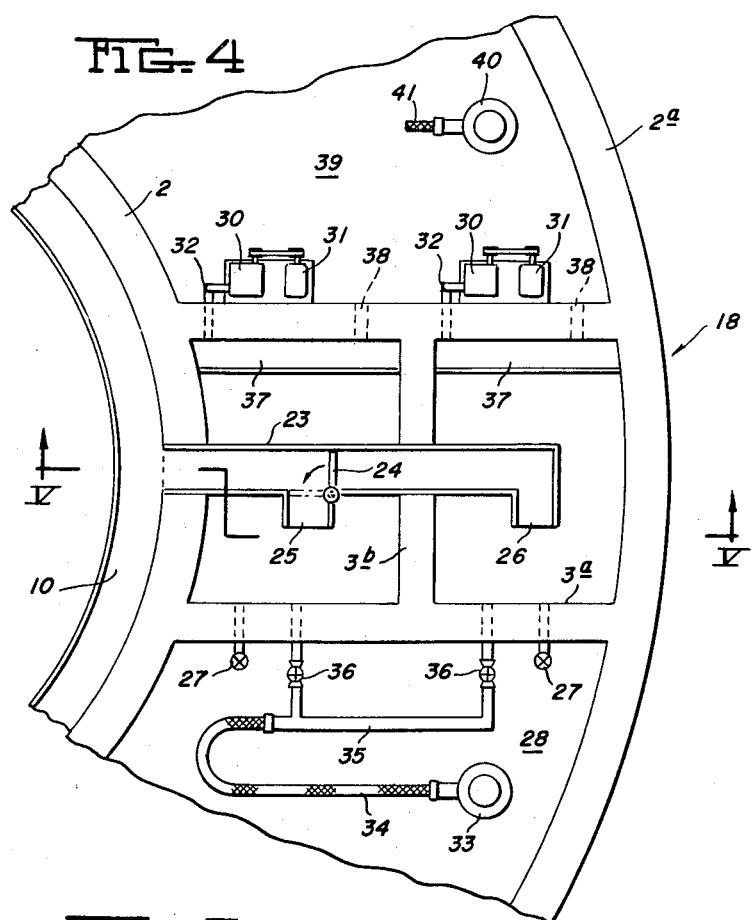
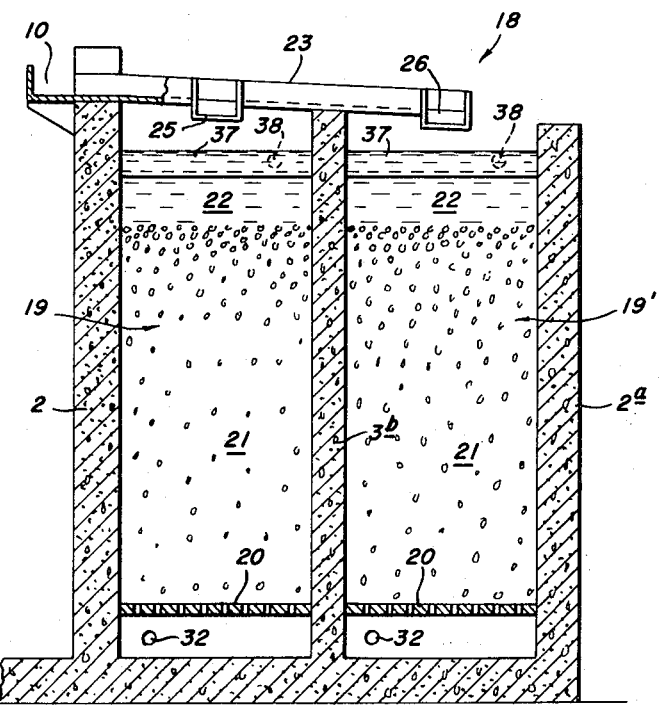

3,713,543

ACTIVATED SEWAGE PLANT

BACKGROUND OF THE INVENTION

This a continuation-in-part of my application Ser. No. 761,616, filed Sept. 23, 1968 for an improvement in Activated Sewage Plant and Process and now abandoned.

The invention herein disclosed relates to sewage treatment plants which produce an effluent that is acceptable to modern pollution regulations. The invention is particularly applicable to compact, relatively attractive and odor-free plants acceptable for use in small municipalities, hospitals, shopping centers, housing developments, industrial plants, rather than to large capacity plants of the type required by cities or highly populated urban areas.

Several types of modern compact sewage treatment plants have come into use during the past decade of ever-tightening anti-pollution controls. The present invention is particularly related to compact plants that are run with a process known as "contact stabilizaton," wherein activated sludge is used as the secondary treatment. The invention is especially applicable to apparatus wherein a central tank is surrounded by an outer tank divided into several compartments, but is useful in other compact plants.

In a usual type of activated sewage treatment, sludge which has passed through certain stages of treatment, and free of much of the initial water content, and which is termed "activated sludge" because of its abundance of micro-organisms, is recycled to an initial processing station and mixed with incoming raw sewage. The activate sludge adsorbs suspended nutrients and micro-organisms from the raw sewage. From this contact zone the mixture is passed over into a settling zone or vessel. This is in the nature of a decanter from the top of which clear liquid is removed, while the solids which settle to the bottom are transferred, with much of the liquid, to a stabilizing zone where it is aerated and activated. It is from this zone that some of the now-activated sludge is recirculated to the contact zone. The sludge not needed for recycle to the contact zone is discharged into an aerobic digester where, under aerobic conditions, objectionable micro-organisms are converted into an inert condition. Here it accumulates to be periodically removed, while the water, commonly referred to as "supernatant liquid" is ultimately recycled to the contact zone.

The effluent water from the top of the settling zone which after chlorination has heretofore been considered to be adequately pure for discharge into streams, being 85 to 90 percent free of B.O.D. (biochemical oxygen demand) and suspended solids, is now no longer permitted to be discharged into surface water without further treatment, either in intermittent filters or stabilization lagoons.

BRIEF SUMMARY OF THE INVENTION

The present invention makes it possible to conform compact systems, including compact systems employing concentric tank arrangements, to present high standards without using lagoons or the usual intermittent filter units presently being demanded for use with compact systems. The present invention therefore enables these compact disposal units to be installed in locations and neighborhoods where plants requiring lagoons or usual filters would not be acceptable, while the effluent liquid is reduced to 98 percent B.O.D. and 99 percent free of suspended solids.

This is accomplished through the use of what I term an "in-depth" filter, referred to in my earlier application as a deep bed fast flow filter, through which the effluent liquid from the settling tank flows to the clearwell in which it is collected and chlorinated. Such a filter, to be hereinafter described in detail, is readily adaptable to the geometry of compact units as presently designed. Using two of these filters, alternating from one to the other, the sewage plant can operate continuously, one being used while the other is being backwashed and made ready for use. Backwash water is collected in a backwash well or compartment and returned to the initial contact zone at a metered rate, avoiding the sudden dumping of a volume of backwash water into the plant.

As applied to a compact unit having a central tank with an encircling tank having radially-extending walls, the two indepth filters and backwash well can most simply be provided through the addition of two or more transverse walls across the outer of the two concentric tanks, and simply by increasing the diameter of the outer wall of the outside tank, that is, the distance between the inner and outer walls, the capacity of the various compartments in the outer tank can still be as great as they were before the inclusion of the two additional compartments, as will be hereinafter more fully apparent.

An important object of this invention is to provide a novel method of and apparatus for treating raw sewage to meet the increasingly tight anti-pollution requirements in an economic manner and with relatively low plant expense and investment compared to apparatus heretofore proposed.

U. S. Pat. No. 3,425,936 discloses a sewage plant in which a filter is proposed to be used in place of a lagoon, but the filter there disclosed requires a multiple tube settling device in advance of the filter, and as a result the operation of the plant must be intermittent.

This and other objects and advantages are secured by the invention as more fully described in connection with the accompanying drawings, wherein:

FIG. 1 illustrates schematically a flow diagram for a plant embodying the invention and illustrating the process;

FIG. 2 is a schematic plan view of a sewage treatment plant showing a preferred arrangement of the present invention;

FIG. 3 is a schematic perspective view illustrating a typical overall concept of a compact plant constructed to embody the invention;

FIG. 4 is a fragmentary plan view of a modified plant similar to FIG. 2 but showing on a larger scale a dual filter arrangement; and FIG. 5 is a vertical section in the plane of line V-V of FIG. 4.

As previously pointed out, the present invention is preferably adapted to a compact or so-called "-packaged" type of treatment plant designed for installation by small municipalities, hospitals, shopping centers and the like, where the sewage output does not substantially exceed approximately two million gallons per day. One typical design here shown has concentric inner and outer watertight walls 2 and 2a, providing two tanks with a common wall between them, and it is supported on an adequate foundation. There are a number of transverse partitions 3 between the inner and outer walls, providing in the outer tank a number of zones or compartments. Preferably, but not always, the structure is circular as being most economical, and at the same time architecturally most acceptable. A bridge 4 extends across the top of the structure and is provided to allow the operation to maintain the equipment and perform such operations as are needed for the functioning of the plant. An access stair is indicated at 5.

According to the present invention, two transverse partitions 3a are provided in addition to the compartments heretofore formed by the partitions 3 for the purpose hereinafter more fully explained.

Referring now to FIG. 1, which is a flow diagram, in conjunction with FIG. 2, it may be explained that the inflowing raw sewage may have first been passed through a comminuter or bar screen (not shown) to reduce or remove large solids. The influent material first enters an aerated zone 6, known as the "contact zone." Here it is mixed with activated or partly processed sludge from a succeeding zone in the system. The activated sludge introduced into the contact zone is rich in microorganisms, and the solids are in the nature of a floc which is highly active in adsorbing colloidal and suspended matter in the raw sewage. This adsorption occurs quickly, and the mixed liquor passes through duct 7 into a settling zone 8 through a well 9. This influent well eliminates surface turbulence by distributing the influx below the surface of the liquid in the tank. The mixed liquor remains in the settling zone where the solids settle to the bottom. The liquid flows over an annular weir 10 into an outlet conduit 11.

The sediment at the bottom of the settling tank is raked in the usual manner by a slowly-revolving rake 12 into a central hopper 13. From here it is transferred along with considerable water into the top of zone or compartment 14 by an air-lift pump, indicated at 15.

In zone 14, known as the "stabilizing zone," the sludge is actively aerated. The air is released at or near the bottom of this compartment by non-clogging nozzles preferably as a succession of bubbles. U. S. Pat. No. 3,182,978 shows a suitable device for this purpose. Here a continuous supply of activated sludge is provided for recycle to the contact zone 6. There will, however, be a continuous influx of sludge, and some of it will be transferred from time to time into zone or compartment 16 designated as the aerobic digester, where the organic material is biologically decomposed in an oxidizing atmosphere into inert, odorless, inoffensive residue, while the supernatant liquid from the digester is returned through pump 17 to the stabilization zone, and eventually into the overflow weir 10.

The process and apparatus just described is known in the art, as is the concentric arrangement of the tanks with the inner tank being the settling tank or zone 8 surrounded by the contact zone 6, the stabilization zone 14, and the digester compartment 16.

The clarified liquid that overflows into the weir 10 of the settling zone and is removed at 11 is at least 85 percent free of the B.O.D. and suspended solids contained in the raw sewage, and as previously explained, the 10 to 15 percent remaining in the clarified liquid was formerly considered unobjectionable and could be discharged after chlorination into surface streams.

According to this invention there is a filter unit, designated generally as 18, which is especially developed for this purpose, and is termed by me as an "in-depth" filter. Actually as here shown the unit 18 comprises two complete filters 19 and 19'. These may be seen In FIGS. 4 and 5. Each has an air-previous reticulated false bottom 20 on which is supported the filtering bed 21. In a typical plant, designed for 200,000 gallons of raw sewage per day, or about 140 gallons per minute, each filter, formed between radially-extending but parallel walls 3a and having a common partition wall 3b, has an area of about 70 square feet. Above the reticulated false bottom the filter bed is at least six feet deep. The filter bed 21 is comprised of a gravel-like coarse sand, the individual grains of which have rounded non-angular surfaces. Hard rounded—but not necessarily speherical—quartz sand particles ranging between 1 mm and 3mm maximum diameter are most useful, and preferably most of the particles in a bed do not vary from one another by more than 1 mm. In other words, while the range is 1 mm to 3 mm. the bed is preferably made up of particles mostly in the 1 mm to 2 mm size or the 2 mm to 3 mm size. Under gravity flow the filter will take care of about 2 gallons of effluent per square foot per minute.

Above each filter bed there is a head space 22 into which the liquid from the settling tank is discharged. In the drawing there is shown a trough or sluice 23 leading from the overflow weir 10 of the settling chamber over the tops of the filters 19 and 19'. There is a gate or other valving means 24 movable from the full line position shown in FIG. 4 where all of the flow is directed over discharge duct 25 into filter 19 to the dotted line position where all of the flow is directed over duct 26 into the top of filter 19'.

Each filter 19 and 19' has a valved outlet 27 leading from the space below the false bottom 20 into the bottom of the adjacent clearwell and chlorine contact tank 28. This compartment has an effluent discharge outlet duct indicated by arrow 29 at a level above the bottom of the tank but below the top of the filter beds 21, so that there is normally filtered liquid flowing into the bottom of the clearwell and rising to the level of the outlet 29. This upwardly-flowing body of liquid is chlorinated in the conventional manner, the chlorinating apparatus not being shown.

This body of chlorinated water in the clearwell also provided an accumulation of clear water for backwashing the filter. Each filter is provided with an air compressor 30 driven by a motor 31 and with an air discharge pipe 32 leading downwardly and opening into the space below the perforate false bottom 20. Also, there is a sump type pump 33 in the clearwell 28 with a hose 34 leading to a manifold 35 with two valved outlets 36 so that water in the clearwell may be selectively forced under pressure through one or the other of the outlets 36 into the space under the false bottom of either filter 19 or filter 19'.

Each filter has an overflow weir 37 at the top of space 22, each weir having a discharge passage 38 opening into a compartment or zone 39 which is a backwash well. When the filter is being backwashed, water flowing upwardly through the bed overflows into one of the weirs 37 and drains into the backwash well. The backwash water, with solids and substances which it removes from the filter bed, is then returned at a regulated or metered rate by means of a pump 40 to the contact zone 6. By collecting the backwash in a separate well and returning it by a motor-driven pump, the backwash water is recycled in an amount and at a time when it will not produce any surge through the plant or introduce an excessive amount of the backwash water which has been chlorinated into the contact zone where the action of the activated sludge should not be imparted.

In a typical plant, such as the one above described of a 200,000 G.P.D. capacity, each of the special filter units will normally operate continuously for 2 or 3 days. A rise in liquid level in the head space 22 of the filter in use will indicate that its filtering rate is dropping and that it should be backwashed. Contrary to expectation, the non-angular sand or gravel particles are highly efficient in trapping small particles in the sewage and effecting its agglomeration into larger fragments or masses, possibly due to some presently unclearly understood adsorption or other surface phenomenon.

Backwashing can be effected in relatively short periods of time. In a plant such as that above mentioned, air alone is back-flushed through the filter medium for about a minute. Then water supplied from pump 33 and air together are used, but the air serves principally to loosen or dislodge the solids from the filtering medium while the water is supplied as a vehicle to carry it into the backwash overflow weirs. Because of the non-angular character of the filter bed, particles roll one upon another under the rising air currents, loosening the deposited material and providing clearance for the water to float such deposits to the top of the bed. In the typical filter above described there are used about seven cubic feet of air per minute at 8 P.S.I. under the false bottom for each square foot of filter area, while about 8 gallons of water per square foot per minute are used in backwashing, so that it will be seen that the air is a significant factor in loosening and agitating the bed and the water is a buoyant fluid for the sand and vehicle to carry away foreign solids.

It is important that the filter bed be of non-angular particles—that is rounded to avoid flat faces or angular corners or edges. It is important that they be hard, either of quartz or some artificial ceramic, since other materials fracture and small fragments and detritus is produced which tends to clog the bed or produce "mud-balling" in which the solids filtered from the effluent form into balls which stay in the bed.

With two filters, one may be in service while the other is backwashing, or has been backwashed and is made ready for use. It will of course be understood that when a filter is being backwashed the valved passage 27 must be closed, and is opened only when the filter is functioning. The deep-bed filter as here described does not require any preliminary settling or separating apparatus that must be cleaned when the filter is backwashed, as in the case with some filters.

The partitions 3a which have been added to the outer of the conventional two tank arrangements, provided for the filter and backwash well, while still leaving the other compartments in their respective positions. Added capacity can be provided where necessary because of the inclusion of these two compartments simply by increasing the radius of the outer wall, the geometry providing a considerable increase in cubical capacity with a relatively small increase in diameter, so that the appearance and architecture of the plant is not altered or detracted from in any way, and a much more efficient plant is provided in the same type of "package" with relatively small increase in cost. At the same time the addition requires little change in the basic engineering and accessory equipment.

I claim:

1. A sewage treatment plant comprising a unitary structure having two spaced substantially concentric inner and outer walls and having substantially radial walls dividing the space between the inner and outer walls into several outer zones and with a single central zone defined by the inner wall, wherein
   a. The single central zone is a settling zone,
   b. the outer zones comprise in rotation, a contact zone, a stabilization zone, an aerobic digester, a backwash well a fast-flow backwash filter, and a chlorinating and effluent discharge zone whereby
   c. the contact zone may simultaneously receive raw sewage from an inlet and activated sludge from the adjacent stabilization zone, and transfer the mixture to the settling zone at the center; the stabilization zone may receive sludge from the central settling zone and transfer a portion of it to the adjacent contact zone and the remainder to the adjacent aerobic digester, the aerobic digester may return supernatant liquid to the stabilization zone, and overflow from the central settling tank may flow directly into the filter, with the filtrate flowing to the adjacent effluent and chlorination zone and the chlorinating zone comprises also a reservoir of clean water for reverse flow of clean water for backwashing through the filter, and the backwash zone on the other side of the filter provides a holding well for backwash water to be recycled to the contact zone, and
   d. duct means through which transfer of the liquids and solids between the several zones is effected.

2. A sewage treatment plant as defined in claim 1 wherein said duct means includes a gravity flow conduit from the upper part of the contact zone to the upper part of the settling zone and there is an overflow from the settling zone to the filter, and an airlift pump is included for transfer of sludge from the settling zone to the adjacent stabilization zone, an airlift pump is provided to transfer supernatant liquid from the aerobic digester to the adjacent stabilization zone, the duct means providing for gravity flow from the filter to the chlorination zone and the chlorinating zone having an overflow for the discharge of treated water from the system, there being a pump means to transfer backwash water from the chlorinating zone through the filter to the backwash well and other pump means for transferring the backwash water from the backwash well to the contact zone.

3. A sewage treatment plant as defined in claim 1 wherein the backwash pump meters the return of backwash water to the contact zone.

4. A sewage treating system as defined in claim 1 wherein said inner and outer walls are substantially circular.

5. A sewage treatment plant as defined in claim 1 wherein said filter has a bed comprised of non-angular hard particles in the size range of about 1–3mm in diameter.

6. In a compact activated sewage treatment plant wherein raw sewage is treated to remove up to 90 percent of the B.O.D. and suspended solids, and having a settling zone, the combination with said plant of
   a. means connected with said settling zone for additional treatment of the sewage to remove as high as 99 percent of the B.O.D. and suspended solids, said means comprising an in-depth filter having a filter media therein through which effluent from said settling zone is directed, the filter having a perforate false bottom below which there is an open space, with a major portion of the filter media throughout the filter into which said effluent is so directed consisting of hard, rounded, non-angular particles ranging between 1mm and 3mm in diameter whereby said non-angular particles trap suspended solids in the sewage and effect agglomeration thereof into larger fragments,
   b. means for forcing air under pressure through said perforate false bottom for backflushing of said media to produce a rolling action of said non-angular particles in said filter and dislodge said larger fragments from said non-angular particles, and
   c. means for forcing backwash water through said perforate bottom to remove said fragments, so dislodged, from the filter.

7. The combination as defined in claim 6 wherein said compact activated sewage treatment plant contains an aerated zone into which the raw sewage first enters and wherein a backwash well is provided to accumulate backwash water and contained solids from the filter and means provided to return the water and contained solids from the backwash well to the aerated zone.

8. The combination as defined in claim 6 wherein said in-depth filter comprises two similar units and the plant includes a clearwell, and wherein each unit has its own compressor, its own false bottom, its own valved discharge from under the false bottom into the clearwell, and wherein a sluice is provided to direct effluent from said settling zone to said filters, said sluice having a gate whereby the effluent from the setting compartment may be selectively directed into one of said filter units, and means for selectively forcing backwash water from said clearwell into the space below the false bottom of either of said filter units.

9. In a compact activated sewage treatment plant wherein raw sewage is treated to remove up to 90 percent of the B.O.D. and suspended solids, and having a settling zone, the combination with said plant of
   a. means connected with said settling zone for additional treatment of the sewage to remove as high as 99 percent of the B.O.D. and suspended solids, said means comprising an in-depth filter through which effluent from said settling zone is directed, the filter having a perforate false bottom below which there is an open space, with a major portion of the media into which said effluent is so directed consisting of hard, rounded, non-angular particles ranging between 1mm and 3mm in diameter whereby said non-angular particles trap suspended solids in he sewage and effect agglomeration thereof into larger fragments,
   b. said in depth filter comprising two similar units and the plant including a clearwell, with each unit having its own compressor, its own false bottom, its own valved discharge from under the false bottom into the clearwell, and a sluice being provided to direct effluent from said settling zone to said filters, said sluice having a gate whereby the effluent from the settling compartment may be selectively directed into one of said filter units, and means for selectively forcing backwash water from said clearwell into the space below the false bottom of either of said filter units,
   c. means for forcing air under pressure through each said perforate false bottom for back-flushing of said media to produce a rolling action of said non-angular particles in said filter and dislodge said larger fragments from said non-angular particles,
   d. means for forcing backwash water through each said perforate bottom to remove said fragments, so dislodged, from the filter, and
   e. the settling zone comprising a setting tank centrally positioned with a concentric wall surrounding it and spaced therefrom, there being radially-extending walls dividing the space between the exterior of the tank and the outer wall to form the next compartment, and having a stabilization zone and a digester and with the two filters being provided between parallel radially-extending walls positioned between a clearwell compartment and a backwash well.

* * * * *